US012634724B2

(12) United States Patent (10) Patent No.: US 12,634,724 B2
Trivedi (45) Date of Patent: May 19, 2026

(54) "REAL FEEL" AUTONOMOUS NETWORK TEST SOLUTION SYSTEM, METHOD, DEVICE, AND PROGRAM

(71) Applicant: RAKUTEN MOBILE, INC., Tokyo (JP)

(72) Inventor: Siddhartha Trivedi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 1064 days.

(21) Appl. No.: 17/770,815

(22) PCT Filed: Mar. 23, 2022

(86) PCT No.: PCT/US2022/021483
§ 371 (c)(1),
(2) Date: Sep. 28, 2023

(87) PCT Pub. No.: WO2023/182983
PCT Pub. Date: Sep. 28, 2023

(65) Prior Publication Data
US 2024/0147268 A1 May 2, 2024

(51) Int. Cl.
*H04L 12/00* (2006.01)
*H04L 41/16* (2022.01)
(Continued)

(52) U.S. Cl.
CPC ............. *H04W 24/06* (2013.01); *H04L 41/16* (2013.01); *H04W 24/04* (2013.01)

(58) Field of Classification Search
CPC ...... H04W 24/06; H04W 24/04; H04L 41/16; H04L 41/069; H04L 41/40; H04L 43/50; G06F 11/3692; H04M 7/0078
(Continued)

(56) References Cited

U.S. PATENT DOCUMENTS 5,796,953 A * 8/1998 Zey .......................... H04L 43/50
709/227
6,516,053 B1 * 2/2003 Ryan ...................... H04M 3/308
379/19
(Continued)

FOREIGN PATENT DOCUMENTS

EP 3163802 A1 * 5/2017 ............. H04L 43/50
EP 3182324 B1 * 2/2019 ............. G06F 21/64
WO WO-2016150748 A1 * 9/2016 .......... H04L 43/0811

OTHER PUBLICATIONS

International Search Report dated Jul. 18, 2022 from the International Searching Authority in International Application No. PCT/US2022/021483.
(Continued)

*Primary Examiner* — Frantz Coby
(74) *Attorney, Agent, or Firm* — Sughrue Mion, PLLC

(57) ABSTRACT

A method of remote testing a telecommunication network may be provided. The method may include receiving, by an electronic device from a test controller, a testing command through a secure connection, wherein the testing command may include information associated with one or more tests to be conducted for testing network performance. The method may further include initiating, by the electronic device, the one or more tests to be conducted in a first sequence order. Based on a test of the performed one or more tests being unsuccessful, the method may include obtaining, by the test controller, log data for the test from one or more network elements in the network. The method may also include analyzing, by the test controller, the obtained log data to determine a network element that causes the test to be unsuccessful.

20 Claims, 7 Drawing Sheets

(51) Int. Cl.
    *H04W 24/04*       (2009.01)
    *H04W 24/06*       (2009.01)

(58) Field of Classification Search
    USPC ........................................................ 370/241
    See application file for complete search history.

(56)              References Cited

U.S. PATENT DOCUMENTS

| | | | |
|---|---|---|---|
| 11,095,548 B1 * | 8/2021 | Jackson | H04L 43/14 |
| 11,297,513 B2 * | 4/2022 | Agarwal | H04W 12/06 |
| 11,411,838 B2 * | 8/2022 | Vasseur | H04L 41/16 |
| 11,546,243 B1 * | 1/2023 | Menon | H04L 43/10 |
| 11,552,874 B1 * | 1/2023 | Pragada | H04L 43/08 |
| 11,736,963 B2 * | 8/2023 | Cummings | G06F 9/4843 |
| | | | 455/418 |
| 11,755,919 B2 * | 9/2023 | Vidal | G06F 11/3684 |
| | | | 706/25 |
| 2007/0202868 A1 * | 8/2007 | Adams | H04M 3/323 |
| | | | 455/424 |
| 2012/0021720 A1 * | 1/2012 | Jiang | H04M 15/8038 |
| | | | 379/189 |
| 2012/0042213 A1 * | 2/2012 | Zimmerman | H04L 1/244 |
| | | | 714/46 |
| 2014/0033175 A1 * | 1/2014 | Lee | G06F 11/3684 |
| | | | 717/124 |
| 2015/0081758 A1 * | 3/2015 | Lee | H04L 67/08 |
| | | | 709/201 |
| 2017/0116102 A1 * | 4/2017 | Wooton | H04L 43/50 |
| 2019/0165991 A1 * | 5/2019 | Cheng | H04L 43/0817 |
| 2019/0340512 A1 * | 11/2019 | Vidal | G06F 11/3692 |
| 2021/0400512 A1 * | 12/2021 | Agarwal | H04M 7/0078 |

OTHER PUBLICATIONS

Written Opinion dated Jul. 18, 2022 from the International Searching Authority in International Application No. PCT/US2022/021483.

* cited by examiner

200

Remote Electronic Device Control and Execution System 201

300

Test Controller Control and Processing Center 301

400

405     Receiving Testing Command

410     Initiating One or More Tests

415     Obtaining Log Data for the Test From One or More Networks Based On At Least One Test Being Unsuccessful 420     Analyzing Log Data to Determine A Network Element That Causes The Test to be Unsuccessful

Figure 5:
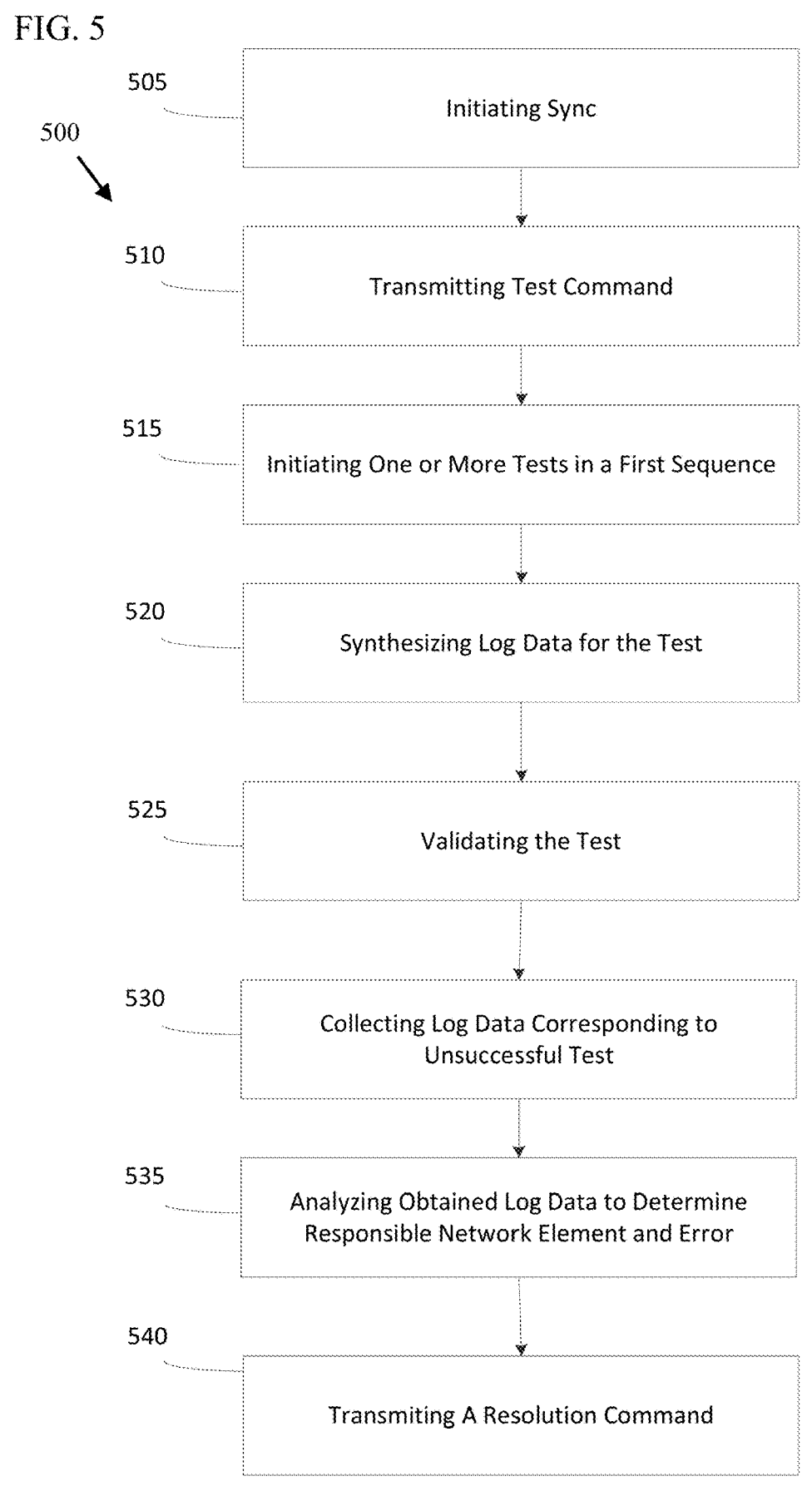

505    Initiating Sync

510    Transmitting Test Command

515    Initiating One or More Tests in a First Sequence

520    Synthesizing Log Data for the Test

525    Validating the Test

530    Collecting Log Data Corresponding to Unsuccessful Test

535    Analyzing Obtained Log Data to Determine Responsible Network Element and Error 540    Transmiting A Resolution Command

700

"REAL FEEL" AUTONOMOUS NETWORK TEST SOLUTION SYSTEM, METHOD, DEVICE, AND PROGRAM

FIELD

The present disclosure relates to remote autonomous testing and issue analysis in a telecommunication network and/or wireless network. In particular, the present disclosure relates to a method, apparatus, and system for autonomous testing and result analysis allowing a network operator to remotely test and identify issues in a telecommunication network and/or wireless network.

BACKGROUND

In a telecommunication network, the telecommunication network operator spends large amounts of money to set up the telecommunication network and to periodically test their telecommunication network. Testing network performance and collecting logs and statistics to "tune" the telecommunication network requires in person visitation in potentially remote or inaccessible areas with testing equipment. To do so after every software update to any component of the telecommunication network is too resource intensive and costs too much in terms of money and human effort. Additionally, because of the resource intensive nature of telecommunication testing, testing more frequently or "on-demand" testing is not feasible.

Therefore, a more efficient and less resource intensive solution to the tedious and labor intensive process of testing the components of the telecommunication network is required.

SUMMARY

According to embodiments, a method of remotely testing a telecommunication network may be provided. The method may include receiving, by an electronic device from a test controller, a testing command through a secure connection, wherein the testing command may include information associated with one or more tests to be conducted for testing network performance; initiating, by the electronic device, the one or more tests to be conducted in a first sequence order; based on a test of the performed one or more tests being unsuccessful, obtaining, by the test controller, log data for the test from one or more network elements in the network; and analyzing, by the test controller, the obtained log data to determine a network element that causes the test to be unsuccessful.

According to embodiments, the method may further include, subsequent to the initiating, synthesizing, by the electronic device, log data for the one or more tests; validating, by the electronic device, a test from the one or more tests based on at least one of a comparison between log data for the test and a reference log or an analysis of the log data for the test using a machine-learned model; and based on the test of the performed one or more tests being unsuccessful, transmitting, from the electronic device to the test controller, information indicating the test as unsuccessful.

According to embodiments, the above-mentioned method wherein the analyzing comprises determining, by the test controller, an error associated with the network element that causes the test to be unsuccessful based on the obtained log data and a reference file.

According to embodiments, the above-mentioned method wherein the determining the error comprises using a machine-learned model, wherein the machine-learned model may be trained using previously collected log data from the one or more network elements.

According to embodiments, the method may further include transmitting, by the test controller, a resolution command including instructions to modify characteristics of the network element that may have caused the test to be unsuccessful.

According to embodiments, the one or more tests are designed to test radio network parameters. According to embodiments, the one or more tests may include one of a verification VoLTE call, testing a MIMO update, or testing beamforming characteristics.

According to embodiments, an apparatus including at least one memory configured to store computer program code; and at least one processor configured to access the computer program code and operate as instructed by the computer program code for remote testing a telecommunication network may be provided. The program code may include first receiving code configured to cause a first processor of the at least one processor to receive, from a second processor of the at least one processor, a testing command through a secure connection, wherein the testing command comprises information associated with one or more tests to be conducted for testing network performance; first initiating code configured to cause the first processor to initiate the one or more tests to be conducted in a first sequence order; first obtaining code configured to cause the second processor to, based on a test of the performed one or more tests being unsuccessful, obtain log data for the test from one or more network elements in the network; and first analyzing code configured to cause the second processor to analyze the obtained log data to determine a network element that causes the test to be unsuccessful.

According to embodiments, a non-transitory computer readable medium storing a program causing a computer to execute a process may be provided. The process may include receiving, by an electronic device from a test controller, a testing command through a secure connection, wherein the testing command comprises information associated with one or more tests to be conducted for testing network performance; initiating, by the electronic device, the one or more tests to be conducted in a first sequence order; based on a test of the performed one or more tests being unsuccessful, obtaining, by the test controller, log data for the test from one or more network elements in the network; and analyzing, by the test controller, the obtained log data to determine a network element that causes the test to be unsuccessful.

BRIEF DESCRIPTION OF THE DRAWINGS

Features, advantages, and significance of exemplary embodiments of the disclosure will be described below with reference to the accompanying drawings, in which like signs denote like elements.

FIG. 5 is a flowchart illustrating an example process for remote testing a telecommunication network, according to embodiments of the present disclosure.

DETAILED DESCRIPTION

Figure 1:
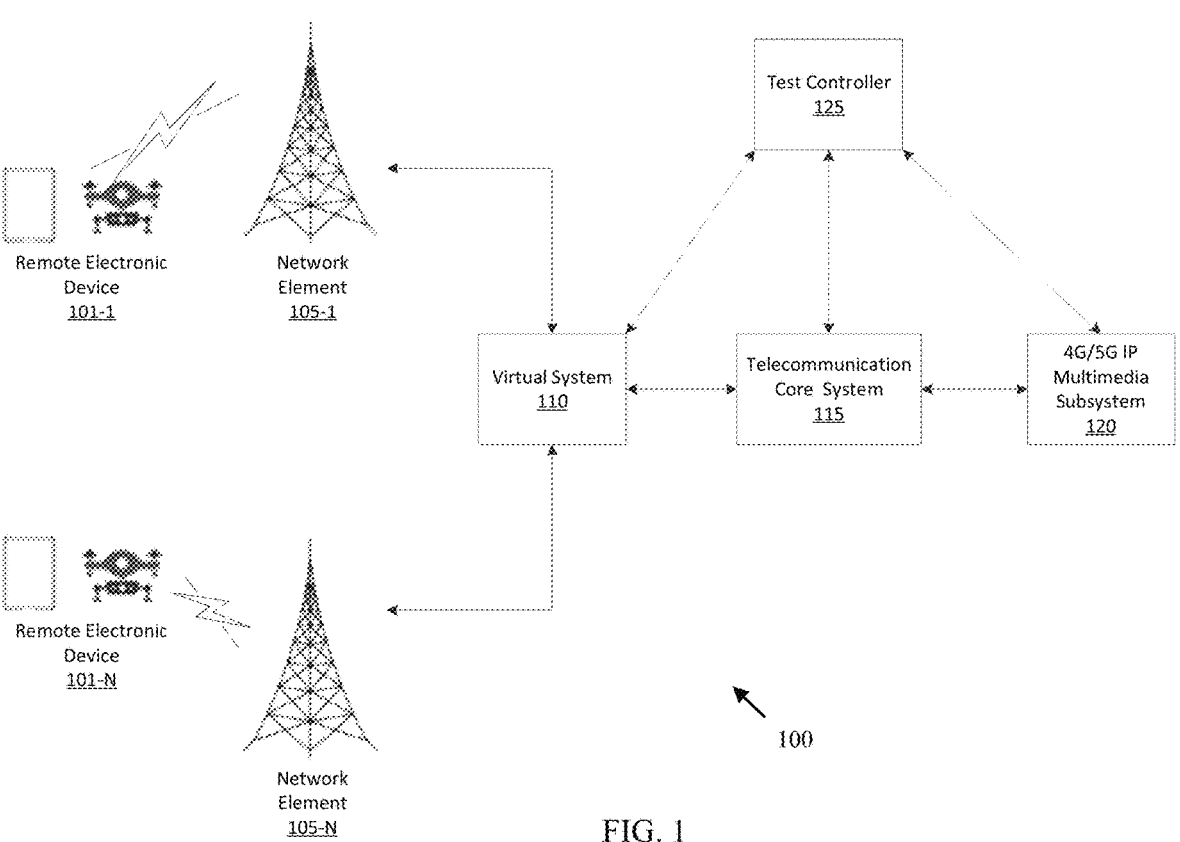
FIG. 1 is an example diagrammatic illustration of a network architecture in which the systems and/or methods described in the present disclosure may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hard-wired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

As stated above, telecommunication networks are expensive to set up and maintain. To ensure that the telecommunication network is performing like it should, the performance of the telecommunication network and its components must be tested. However, methods of testing the telecommunication network in previous works often require an operator to physically go to a location to test the telecommunication network, for example, when there is a software update to the network. In addition to often requiring an operator, previous methods utilize the computing resources of the telecommunication network itself or its central data server, costing the telecommunication network cloud computing resources and diverting computing resources from the components of the telecommunication network. Therefore, even if tested infrequently (e.g., the software updates are infrequent), testing the telecommunication network, is a resource intensive process, both in terms of the computing resources of the telecommunications network and the human labor.

Therefore, a remote and autonomous method, system, or apparatus is required to test the performance of the telecommunication network that is not as resource intensive for the telecommunication network.

Embodiments of the present disclosure relate to autonomous and remote testing of a telecommunication network, and then analyzing the results of the tests to identify issues at the remote electronic device using the processing power of the remote electronic device. Utilizing remote electronic devices and their internal processing power saves considerable computing and cloud resources of the telecommunication network. Further, utilizing remote electronic devices that may be sent instructions to conduct a bevy of tests, analyze the results of the tests (e.g., determine if the tests are passed or failed), and publish the results to a central test controller associated with the telecommunication network enables more frequent but less resource intensive tests of the telecommunication network. More frequent testing that does not strain the resources of the telecommunication network can better maintain and improve the performance of the telecommunication network or its components.

FIG. 1 is an exemplary illustration of a network architecture 100 in which the systems and/or methods described in the present disclosure may be implemented.

As shown in FIG. 1, the network infrastructure 100 may include one or more remote electronic devices (e.g., remote electronic device 101-1, . . . , remote electronic device 101-N) (hereinafter referred to as remote electronic device 101-1), a plurality of network elements (e.g., network element 105-1, . . . , network element 105-N) (hereinafter referred to as network element 105-1), a virtual system 110, a test controller 125, a telecommunication core system 115, and 4G/5G IP multimedia subsystems 120.

As shown in FIG. 1, the network infrastructure 100 may include one or more remote electronic device 101-1. According to embodiments of the present disclosure, the one or more remote electronic device 101-1 may be fixed at a selected location or at a random location in a radio-frequency (RF) coverage geography. In some embodiments, the one or more remote electronic device 101-1 may be a remote computing device such as a personal computer, a customized electronic device to interface with the telecommunication network, or a drone device that may be autonomously moved. In some embodiments, the remote electronic device 101-1 may be fixed at a specific location, for example, a network store, an employee office, or sales office. The remote electronic device 101-1 may utilize an internal power source or may utilize a local power source that may be distinct from the power grid of the telecommunication network, reducing strain on the telecommunication network.

According to embodiments, the remote electronic device 101-1 may test the telecommunication network or components of the telecommunication network at a pre-defined time or spontaneously based on commands from the test controller 125. As an example, the remote electronic device 101-1 may perform one or more tests every month, every six months, every year, etc.

In some embodiments, the remote electronic device 101-1 may perform one or more tests based on a testing commend from the test controller 125, wherein the testing command may include information related to the tests to be conducted, the order in which the tests may be conducted, the components of the telecommunications involved in the testing, the components of the telecommunication network being tested, and/or any information relevant to the testing. In some embodiments, the remote electronic device 101-1 may test the telecommunication network in response to receiving a testing command from the test controller 125. In some embodiments, the remote electronic device 101-1 mat test the telecommunication system automatically based on a testing schedule.

According to embodiments, the remote electronic device 101-1 may initiate a secure connection between the remote electronic device 101-1 and the test controller 125. The remote electronic device 101-1 may use the secure connection to communicate with the test controller 125. In some embodiments, the remote electronic device 101-1 may use the secure connection between remote electronic device 101-1, the test controller 125, and another remote electronic device 101-2 that may be needed to perform a specific test. As an example, testing VoLTE service between two remote electronic devices 101-1 and 101-2, the test controller 125 may help pair remote electronic devices 101-1 and 101-2 with each other to conduct the VoLTE call between the remote electronic devices 101-1 and 101-2.

According to embodiments, the remote electronic device 101-1 may initiate and/or perform one or more tests to analyze the performance of the telecommunication network. The one or more tests may include, without limitation, any tests directed testing or measuring the performance of the telecommunication network. In some embodiments, the tests may include voice calling, video calling, data throughout during uplink and downlink, video streaming, traffic pinging, mean opinion score (MOS) and/or NR/LTE handover. In some embodiments, the tests may be initiated and/or performed in a specific order. In some embodiments, the testing command from the test controller 125 may indicate the tests to be performed and the order in which they may be performed.

In some embodiments, the network element 105-1 may, subsequent to receiving a testing command, initiate and/or perform the one or more tests in the testing command. In some embodiments, the tests may be performed in a specific order. In some embodiments, the initiation of the test may be followed by synthesizing, by the remote electronic device 101-1, log data for the one or more tests. Log data may include, but is not limited to, end-to-end call logs of the remote electronic device 101-1 or the logs from the one or more remote electronic devices involved in the testing. In some embodiments, the remote electronic device 101-1 may receive reference log data from the test controller 125 that may be used as a reference to determine whether the tests were successful or unsuccessful.

The remote electronic device 101-1 may validate the test results based on a comparison between the synthesized log data and the reference log data. In some embodiments, the remote electronic device 101-1 may validate the test results based on the synthesized log data using machine-learned models. In some embodiments, based on the test being successful or unsuccessful, the remote electronic device 101-1 may publish or transmit the test results to the test controller 125. Thus, in some embodiments, the remote electronic device 101-1 may publish the results to the test controller 125 to show how network has performed at specific fix point location and at particular time.

Since the analysis and/or validation of the tests may happen at the remote electronic device 101-1, the computations required at the test controller 125 or the central data server of the telecommunication network are reduced, increasing the efficiency of the telecommunication network and reducing the load associated to testing the telecommunication network.

According to some embodiments, the test controller 125 may be a central data server or at least one of a plurality of data servers associated with the telecommunication network.

According to embodiments of the present disclosure, the test controller 125 may generate a testing command and transmit the testing command to the remote electronic device 101-1 indicating to the remote electronic device 101-1 to initiate the one or more tests included in the testing command. In some embodiments, the testing command may include information including, but not limited to, the tests to be conducted, the order in which the tests may be conducted, the components of the telecommunications involved in the testing, the components of the telecommunication network being tested, and/or any information relevant to the testing.

In some embodiments, the test controller 125 may enable pairing between one or more remote electronic devices 101-1 and 101-2 to test the performance of the telecommunication network. As an example, in some embodiments, the test may include a VoLTE call being performed between remote electronic devices 101-1 and 101-2, and the test controller 125 may enable synching of each remote electronic devices 101-1 and 101-2 with the test controller 125 and pairing of remote electronic devices 101-1 and 101-2 with each other to perform the test.

The test controller 125 may prepare a reference file or a reference log that may be used by the remote electronic device 101-1 for validation of the test results. In some embodiments, the test controller 125 may collect end-to-end call logs from a plurality of network elements or previous tests, parse the logs or filter the logs, and prepare a reference file or reference log that the remote electronic device 101-1 may use for determining whether a test was a successful or unsuccessful.

In some embodiments, the test controller may receive transmission or publication of test results from the remote electronic device 101-1. In some embodiments, subsequent to receiving transmission or publication from the remote electronic device 101-1 that a test or tests were unsuccessful, the test controller 125 may direct network elements involved in the tests to start collecting real-time logs associated with the test(s). In some embodiments, the test controller 125 may direct the network elements involved in the tests to start collecting real-time logs associated with the one or more remote electronic devices 101-1 and 101-2 involved in the test.

Based on the real-time logs received from the network elements, the test controller 125 may perform a deep analysis of the unsuccessful test. In some embodiments, the test controller 125 may determine an error associated with the network element or component of the telecommunication network that may have caused the test to be unsuccessful based on the obtained real-time logs and the reference logs. In some embodiments, the determining of the error associated with the network element or component of the telecommunication network may include using a machine-learned model trained to identify errors based on the real-time logs and/or test results. In some embodiments, the test controller 125 may generate and transmit a resolution command including instructions to resolve the identified error. In some embodiments, the resolution command may include instructions to modify characteristics of the network element or to modify the characteristics of the telecommunication network that causes the test to be unsuccessful.

In some embodiments, the deep analysis of the unsuccessful test may be performed by the remote electronic device 101-1. In some embodiments, the remote electronic device 101-1 may identify the error associated with the network element or the component of the telecommunication network. The remote electronic device 101-1 may use a local model of a machine learned model that is trained using previous log data, previous reference logs, and previous test results to determine the error.

According to some embodiments, the network infrastructure 100 may include a virtual system 110. The virtual system 110 may include a plurality of Central Units (CU) or Distributed Units (DU) that virtualize dedicated hardware components and/or baseband functions into software functions using general purpose hardware. The virtual system 110 may allow for flexible scaling of the telecommunication network. In some embodiments, the vCU may operate non-real-time processing from a centralized location. The vDU may host real-time processing functions. The virtual system 110 included in the network infrastructure 100 may include fully virtualized infrastructure built on cloud-native principles including, but not limited to, fully virtualized Radio Access Network (vRAN) or implementations promoted by alliances such as Open Radio Access Network (O-Ran).

According to some embodiments, the network infrastructure 100 may include a telecommunication core system 115. The telecommunication core system 115 may include cloud-aligned service-based architecture components that support key functions such as security, authentication, and session management across the 4G or 5G telecommunication network. In some embodiments, the telecommunication core system 115 may include virtualized components that may be defined by the Third Generation Partnership Project (3GPP) and may utilize cloud-based architecture that enables 5G functions and interactions. In some embodiments, the telecommunication core system 115 may leverage 4G evolved Packet Core (EPC) or 5G EPC. In some embodiments, the 4G or 5G EPC may include a plurality of components to implement functions including, but not limited to, authentication, mobility management, structured data storage, unstructured data storage, policy control, session management, application function, user equipment, and network exposure function.

According to some embodiments, the network infrastructure 100 may include a 4G/5G IP multimedia subsystem (IMS) 120. The 4G/5G IMS 120 may be a reference architecture defined by 3GPP for delivering rich communication services. As an example, in 4G LTE networks, the IMS 120 may be used for Voice over LTE (VoLTE). As another example, in 5G networks, the IMS 120 may be used Voice over 5G (Vo5G). Thus, in 4G/5G IMS 120 may be used to facilitate rich communication such as audio or video communication over the telecommunication network. In some embodiments, the 4G/5G IMS 120 may be used to test the performance of the telecommunication network for tests such as voice call or media streaming.

Figure 2:
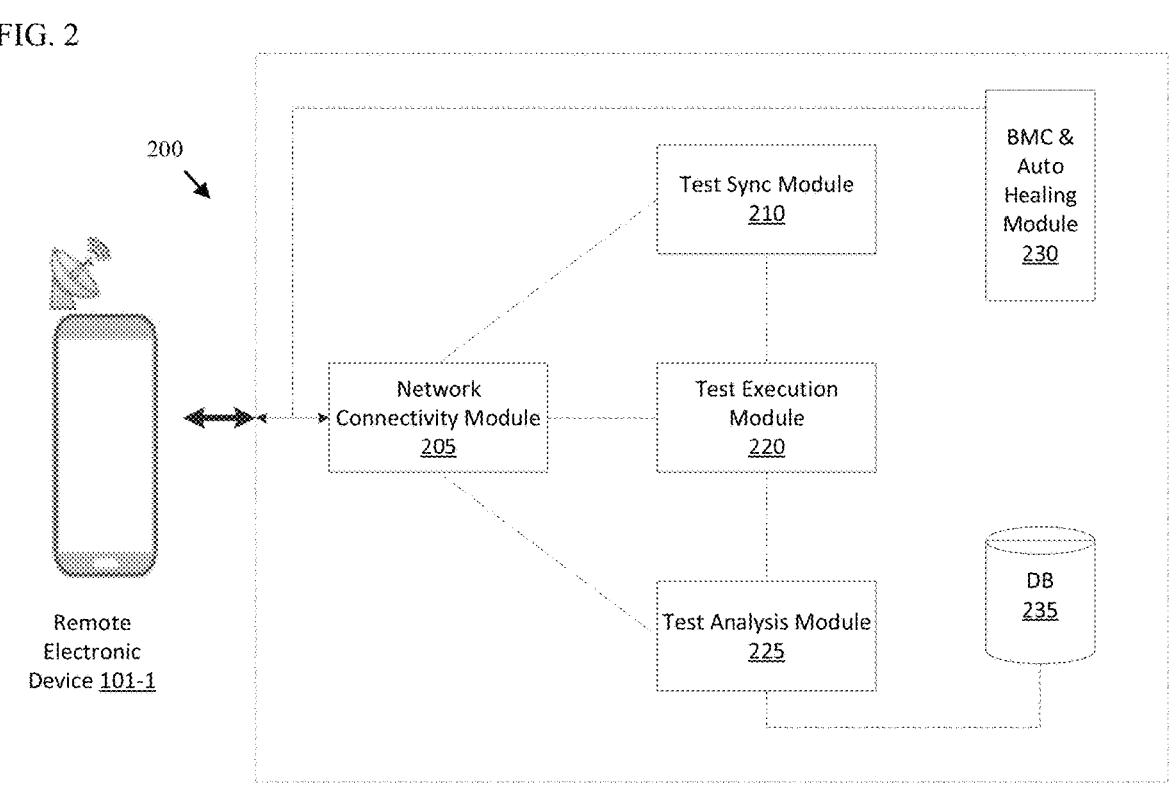
FIG. 2 is an example diagrammatic illustration of a component of the network architecture of FIG. 1, according to embodiments of the present disclosure.

FIG. 2 is an example diagrammatic illustration of an exemplary remote electronic device or remote electronic device control and execution system 201 of the network architecture of FIG. 1, according to embodiments of the present disclosure.

As shown in FIG. 2, the remote electronic device 101-1 or the remote electronic device control and execution system 201 may include a network connectivity module 205, test sync module 210, test execution module 220, test analysis module 225, BMC and auto healing module 230, and database 235.

According to embodiments of the present disclosure, the network connectivity module 205 of the remote electronic device 101-1 may include a device modem, and the device modem may be configured to capture air interface logs associated with the remote electronic device 101-1. The test sync module 210 may establish a secure connection between the remote electronic device 101-1 and the test controller 125, receive the testing command from the test controller 125, and/or transmit/publish the results of the tests to the test controller 125.

According to embodiments, the test execution module 220 may be used to initiate and perform the tests based on information included in the testing command. In some embodiments, once performed, the test analysis module 225 may analyze or validate the tests performed by the test execution module 220. In some embodiments, the network connectivity module 205 may collect the air interface logs related to the test and the remote electronic device 101-1 or synthesize log data for the one or more tests. The network analysis module 225 may parse the log data, and validate the one or more tests based on the comparison between log data for the test and a reference log received from the test controller 125. In some embodiments, the test analysis module 225 may validate the one or more tests based on an analysis of the log data for the test using a machine-learned model. The baseboard management controller (BMC) and auto healing module 230 may control the power requirement and device control function.

Figure 3:
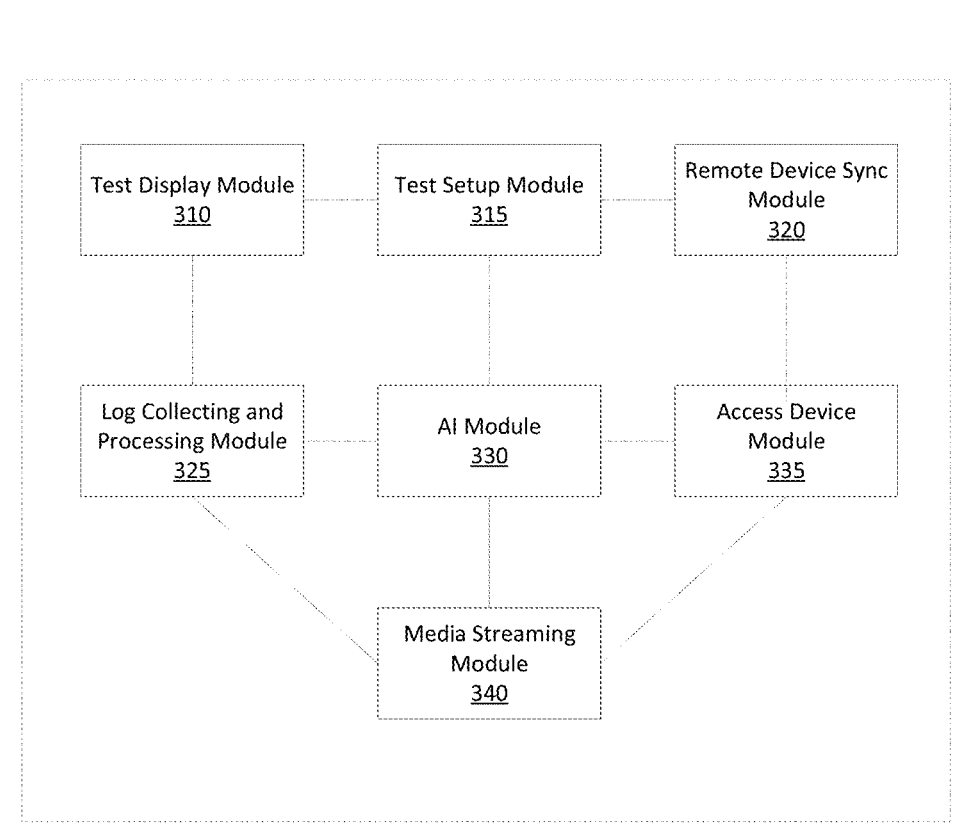
FIG. 3 is an example diagrammatic illustration of a component of the network architecture of FIG. 1, according to embodiments of the present disclosure.

FIG. 3 is an example diagrammatic illustration of an exemplary test controller 125 or a test controller control and processing center 301 of the network architecture of FIG. 1, according to embodiments of the present disclosure.

As shown in FIG. 3, the test controller 125 or test controller control and processing center 301 may include a test display module 310, test setup module 315, remote device sync module 320, log collecting and processing module 325, AI module 330, access device module 335, and media streaming module 340.

According to embodiments of the present disclosure the test display module 310 may display controls for test execution, may display test status, and may display test results. The test setup module 315 may enable a user or a network operator to set-up one or more tests. As an example, an operator may select a VoLTE call to test the performance of the telecommunication network. In some embodiments, the test setup module 315 and the test display module 310 may display controls to set-up and generate the testing command, including display controls that may enable selecting one or more tests to be performed to test the performance of the telecommunication network, selecting one or more remote electronic devices that may be used for testing, and controlling the test execution.

According to embodiments, the remote device sync module 320 may communicate with remote electronic devices 101-1 and 101-2 to establish a pairing between them. The log collecting and processing module 325 may collect end-to-end call logs of the remote electronic device 101-1 or the logs from the one or more remote electronic devices involved in the testing. In some embodiments, the log collecting and processing module 325 may parse and/or filter the logs to prepare the reference file or reference logs that may be compared with the test logs to determine whether a test was successful or unsuccessful. The remote electronic device 101-1 may receive reference log data from the log collecting and processing module 325 that may be used as a reference to determine whether the tests were successful or unsuccessful.

In some embodiments, the log collecting and processing module 325 may determine an error associated with the network element that causes the test to be unsuccessful based on the obtained log data and a reference file. In some embodiments, determining the error may include using a machine-learned model, wherein the machine-learned model may be trained using previously collected log data from the one or more network elements. In some embodiments, the machine-learned model may be trained using previous log data, previous reference logs, and previous test results to determine the error.

In some embodiments, the AI module 330 may be used to develop or store artificial intelligence models that may be trained using previously collected log data to determine errors that may have caused the test to be unsuccessful. In some embodiments, the log collecting and processing module 325 or the AI module 330 generate or transmit a resolution command including instructions to modify characteristics of the network element or modify characteristics of the telecommunication network that causes the test to be unsuccessful.

The access device module 335 may apply appropriate security policy and monitor the BMC and auto healing module 230 of the remote electronic device 101-1 to manage access control to the remote electronic device 101-1. The media streaming module 340 may control the media streamed between the paired remote electronic devices 101-1 and 101-2 while testing the telecommunication network. As an example, the media streaming module 340 may control the media that is streamed when the network performance during uplink or downlink is being tested. The media control module 340 may also validate the media that may be streamed or otherwise exchanged during a test. As an example, in a VoLTE call between remote electronic devices 101-1 and 101-2, a call may be streamed from the remote electronic device 101-1 to remote electronic device 101-2. The media streaming module 340 may control the media/content streamed over the call and may also validate the that the media/content received on the other end. The media streaming module 340 may ensure that the content of the call as received is accurate and was not altered significantly during the streaming.

Figure 4:
FIG. 4 is a flowchart illustrating an example process for remote testing a telecommunication network, according to embodiments of the present disclosure.
Figure 4:
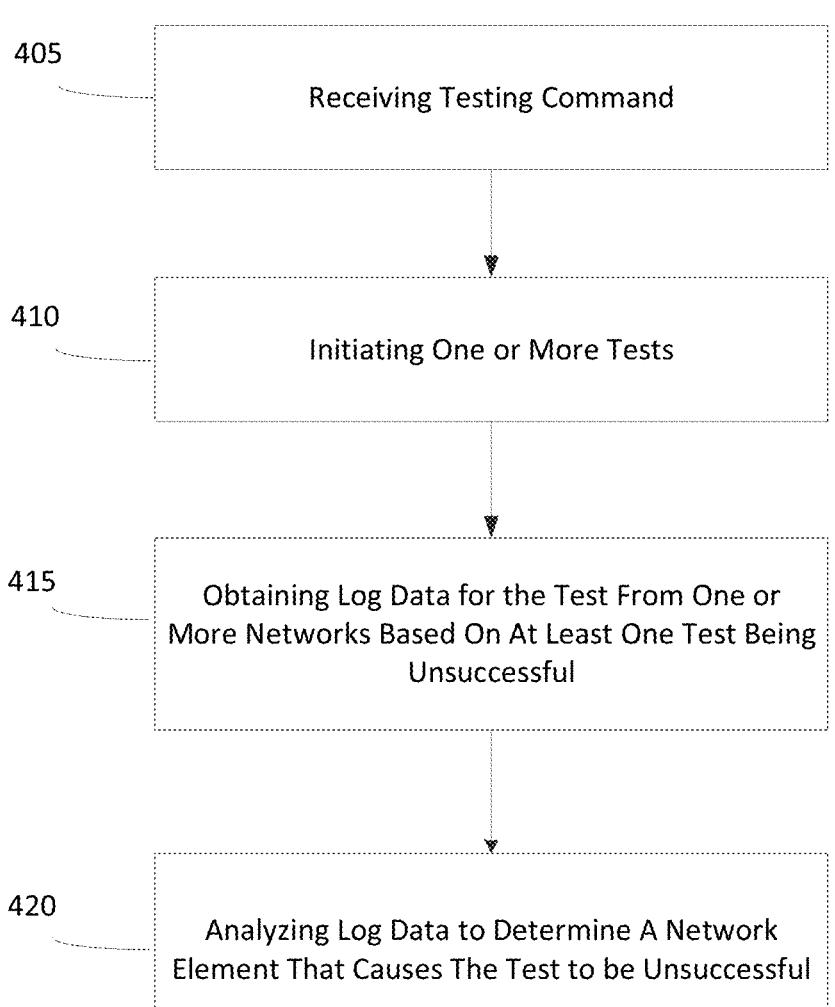

FIG. 4 is a flowchart illustrating an example process 400 for remote testing a telecommunication network, according to embodiments of the present disclosure.

As shown in FIG. 4, at operation 405, an electronic device may receive a testing command from a test controller. The testing command may be received through a secure connection between the electronic device and the test controller. In some embodiments, the testing command may include information associated with one or more tests to be conducted for testing network performance and a first sequence for conducting the one or more tests. The one or more tests to be conducted for testing network performance may include tests designed to test radio network parameters. The tests to be conducted may include one or more of voice calling, video calling, data throughout during uplink and downlink, video streaming, traffic pinging, mean opinion score (MOS) and/or NR/LTE handover. In some embodiments, the one or more tests may include verification VoLTE call, testing a MIMO update, or testing beamforming characteristics. In some embodiments, the testing command may be generated by the test controller under the direction of a network operator and transmitted to the electronic device. However, in some embodiments, the electronic device may conduct the tests periodically, and may receive the testing command automatically without the direction of a network operator. In some embodiments, the test controller may generate the testing commands automatically based on some pre-defined conditions or a set schedule.

At operation 410, the electronic device may initiate the one or more tests to be conducted in a first sequence order. In some embodiments, subsequent to initialization, the electronic device may synthesize log data for the one or more tests, wherein the log data may be collected and/or captured from air interface logs using a modem that may be a component of the electronic device. The electronic device may validate a test from the one or more tests based on at least one of a comparison between log data for the test and a reference log or an analysis of the log data for the test using a machine-learned model. In some embodiments, based on the test of the performed one or more tests being unsuccessful, the electronic device may transmit information indicating the test as unsuccessful to the test controller.

At operation 415, the test controller may obtain real-time log data for a test from one or more network elements in the network based on the test out of the one or more tests performed being unsuccessful. In some embodiments, prior to obtaining real-time log data for the test from one or more network elements, the test controller may transmit or direct the one or more network elements start collecting real-time logs associated with the test(s) and then transmit the real-time logs associated with the test(s) to the test controller. In some embodiments, real-time logs are obtained only in the event of an unsuccessful test. However, embodiments may include obtaining real-time logs for successful tests and unsuccessful tests for training one or more machine-learned models.

At operation 420, the test controller may analyze the obtained log data to determine a network element that causes the test to be unsuccessful. In some embodiments, the analyzing may include determining, by the test controller, an error associated with the network element that causes the test to be unsuccessful based on the obtained log data and a reference file. The determining of the error may include using a machine-learned model, wherein the machine-learned model may be trained using previously collected log data from the one or more network elements. In some embodiments, subsequent to analyzing the obtained log data to determine an error associated with the network element that causes the test to be unsuccessful, the test controller may transmit a resolution command comprising instructions to modify characteristics of the network element that causes the test to be unsuccessful.

FIG. 5 is a flowchart illustrating an example process 500 for remote testing a telecommunication network, according to embodiments of the present disclosure.

As shown in FIG. 5, the process 500 may include, at operation 505, a sync may be initiated between a remote electronic device and the test controller. As an example, a test to be performed may include remote electronic devices 101-1 and 101-2, and the test controller 125 may enable synching of each remote electronic devices 101-1 and 101-2 with the test controller 125 and pairing of remote electronic devices 101-1 and 101-2 with each other to perform the test.

In some embodiments, prior to initiating a sync, one or more tests to determine the performance of the telecommunication network be selected. In addition to selecting the one or more tests, one or more remote electronic devices to test the telecommunication network may be selected from a plurality of telecommunication devices. As an example, a VoLTE call test may be performed in a problematic area. A network operator may use the test display module 310 to remotely select the test to be performed, e.g., VoLTE call, and may also select one or more remote electronic devices 101-1 and 101-2 from the problematic area. The remote device sync module 320 of the test controller 125 may enable a secure connection between the test controller 125 and each of the remote electronic devices 101-1 and 101-2. Additionally, in some embodiments, the remote device sync module 320 of the test controller 125 may enable a pairing between the remote electronic devices 101-1 and 101-2.

At operation 510, a testing command may be transmitted. Based on the network operator selecting one or more tests to be conducted, the testing command may include information related to the tests to be conducted, the order in which the tests may be conducted, the components of the telecommunications involved in the testing, the components of the telecommunication network being tested, and/or any information relevant to the testing. The testing command may be transmitted to the remote electronic device to initiate and perform testing. As an example, to test VoLTE call between remote electronic devices 101-1 and 101-2 from the problematic area, the network operator may have to select the appropriate test and devices, and then transmit the testing command from the test controller 125 to the remote electronic devices 101-1 and 101-2 in the problematic area.

In some embodiments, based on one or more remote electronic devices being selected to perform or conduct a test, the international mobile subscriber identity (IMSI) of the selected remote electronic devices may be transmitted using automation or script tools. As an example, the remote electronic devices 101-1 and 101-2 may be selected and the IMSI associated with each device may be sent end-to-end through the network (e.g., PCAP logs) covering 4G/5G IMS 120, telecommunication core 115, and other functional components of the telecommunication network.

At operation 515, one or more tests may be initiated in a first sequence. Based on the received testing command from the test controller, the remote electronic device may initiate a test of the one or more tests. As an example, initialization may include remote electronic device 101-1 inviting remote electronic device 101-2 for a VoLTE call, both of which being registered with the telecommunication network and synced with the test controller 125.

At operation 520, log data for the test may be synthesized. In some embodiments, the remote electronic device may collect and synthesize device modem logs from the remote electronic device associated with the one or more tests to be conducted. As an example, remote electronic devices 101-1 and 101-2 may collect and synthesize log data collected using their respective network connectivity module 205 as the VoLTE test may be conducted. Conducting a VoLTE test may include making a call using a Session initiation protocol (SIP) invite message from remote electronic device 101-1 to remote electronic device 101-2 which accepts the call using a SIP 200 okay message. The remote electronic devices 101-1 and 101-2, may then create media transfer protocol (MTP) that may be pre-shared between the remote electronic devices 101-1 and 101-2 and the test controller 12. Using the MTP may ensure that media played or "voice" played at one remote electronic device may be recorded at the other remote electronic device and vice versa. The VoLTE call may be ended after media sharing is complete using an SIP bye message. The parts of communications, media, signaling, and messages exchanged between the remote electronic devices 101-1 and 101-2 (e.g., SIP 200 ok message, MTP initiation, SIP bye message, etc.) may be included in the log data that is collected and synthesized. Once an end message is received, the test may be terminated and the results of the test may be analyzed.

At operation 525, the test may be validated by the remote electronic device. Validating a test, by the remote electronic device may include a comparison between log data for the test and a reference log or an analysis of the log data for the test using a machine-learned model. As an example, the remote electronic devices 101-1 and 101-2 may process the media received from the other and may compare the media received to the media sent, mean opinion score (MOS) and quality of service (QoS) between the media sent and media received, etc. As an example, the test may be successful if the MOS for the recorded media when compared to the original media is greater than or equal to 4, i.e., the test may be successful if the voice quality during the call is good. In some embodiments, validating the test by the electronic device may also include filtering the signaling messages (e.g., 3GPP and SIP protocol messages) from the log data and comparing the filtered signaling messages with the reference file or reference logs. As another example, validating a test may include comparing call flow messages exchanged between the remote electronic devices 101-1 and 101-2 during the test to determine whether the call flow messages arrived in sequence and arrived in time. The test may be successful if the call flow messages arrived in sequence and arrived in time. Based on the results of the tests, the remote electronic device may transmit the result or at least an indication of the result to the test controller. As an example, based on the test being unsuccessful, the remote electronic device 101-1 may transmit information indicating the test was unsuccessful to the test controller.

At operation 530, log data corresponding to the unsuccessful test may be collected by the test controller. In some embodiments, subsequent to receiving transmission or publication from the remote electronic device 101-1 that a test or tests were unsuccessful, the test controller 125 may direct network elements (e.g., 105-1) involved in the tests to start collecting real-time logs associated with the test(s). Implementing operations 520-530 at the remote electronic device instead of at the test controller leverages the internal processing power of the remote electronic device and improves the efficiency with which the computing power of the telecommunication network is utilized. In some embodiments, operations 520-530 may be implemented at the test controller.

At operation 535, the collected log data corresponding to the unsuccessful test may be analyzed and the responsible network element and/or error may be determined. As an example, the test controller may analyze the obtained log data to determine a network element that causes the test to be unsuccessful. In some embodiments, the analyzing may include determining, by the test controller, an error associated with the network element that causes the test to be unsuccessful based on the obtained log data and a reference file. The determining of the error may include using a machine-learned model, wherein the machine-learned model may be trained using previously collected log data from the one or more network elements.

At operation 540, a resolution command may be transmitted from the test controller to the remote electronic device. In some embodiments, subsequent to analyzing the obtained log data to determine an error associated with the network element that causes the test to be unsuccessful, the test controller may transmit a resolution command comprising instructions to modify characteristics of the network element that causes the test to be unsuccessful. In some embodiments, the log collecting and processing module 325 or the AI module 330 generate or transmit a resolution command including instructions to modify characteristics of the network element or modify characteristics of the telecommunication network that causes the test to be unsuccessful. In some embodiments, a trigger anomaly ticket may be generated if an error is determined.

Figure 6:
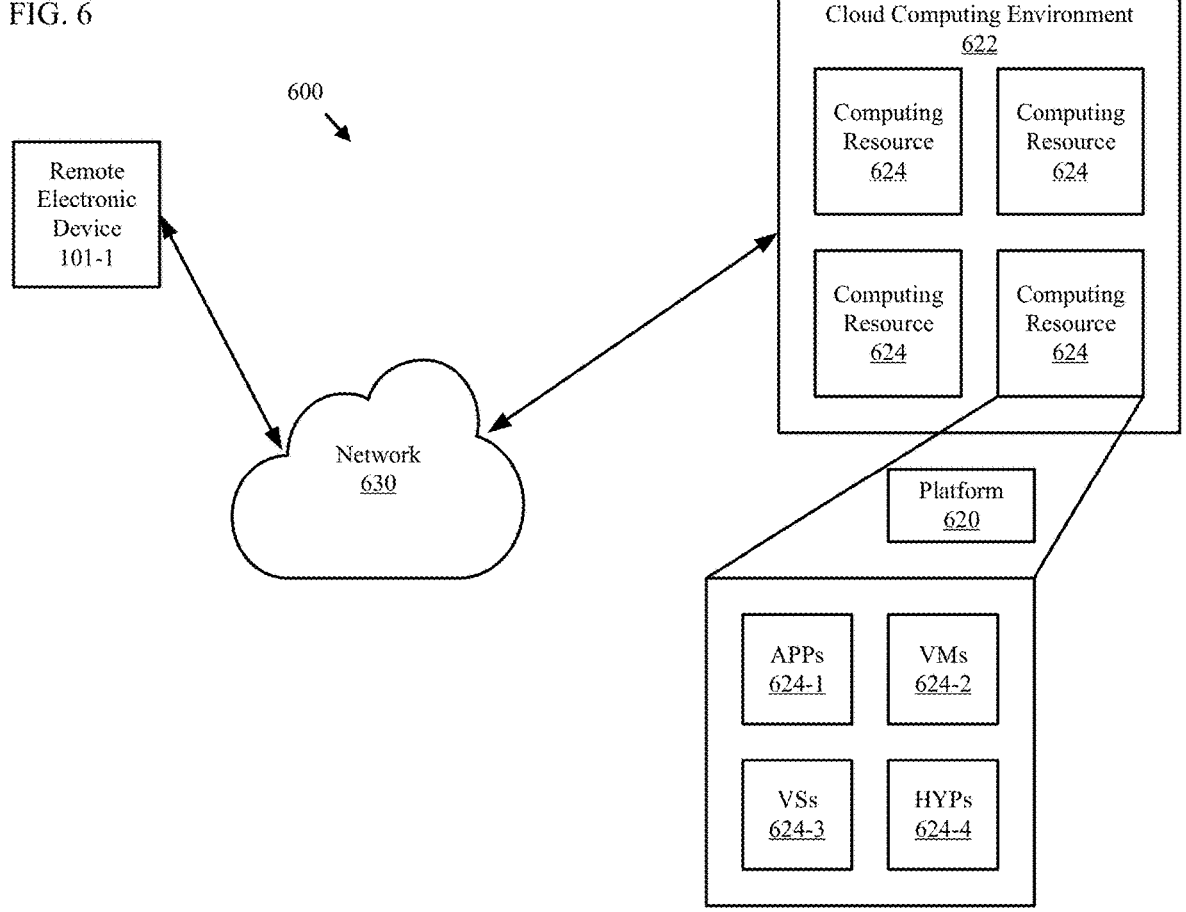
FIG. 6 is a diagram of example components of one or more devices of FIG. 1, according to embodiments of the present disclosure.

FIG. 6 is a diagram of example components of one or more devices of FIG. 1, according to embodiments of the present disclosure.

As shown in FIG. 6, environment 600 may include a remote electronic device 101-1, a platform 620, and a network 630. Devices of environment 600 may interconnect via wired connections, wireless connections, or a combination of wired and wireless connections. In embodiments, any of the functions of the elements included in network monitoring system 100 may be performed by any combination of elements illustrated in FIG. 6. For example, in embodiments, remote electronic device 101-1 may perform one or more functions associated with a personal computing device, and platform 620 may perform one or more functions associated with any of the test controller 125 or components of the test controller control and processing center 301.

The remote electronic device 101-1 includes one or more devices capable of receiving, generating, storing, processing, and/or providing information associated with platform 620. For example, the remote electronic device 101-1 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the remote electronic device 101-1 may receive information from and/or transmit information to platform 620.

Platform 620 includes one or more devices capable of receiving, generating, storing, processing, and/or providing information. In some implementations, platform 620 may include a cloud server or a group of cloud servers. In some implementations, platform 220 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 is not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc. services that do not require end-user (e.g., remote electronic device 101-1) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by remote electronic device 101-1. Application 624-1 may eliminate a need to install and execute the software applications on remote electronic device 101-1. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., remote electronic device 101-1), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
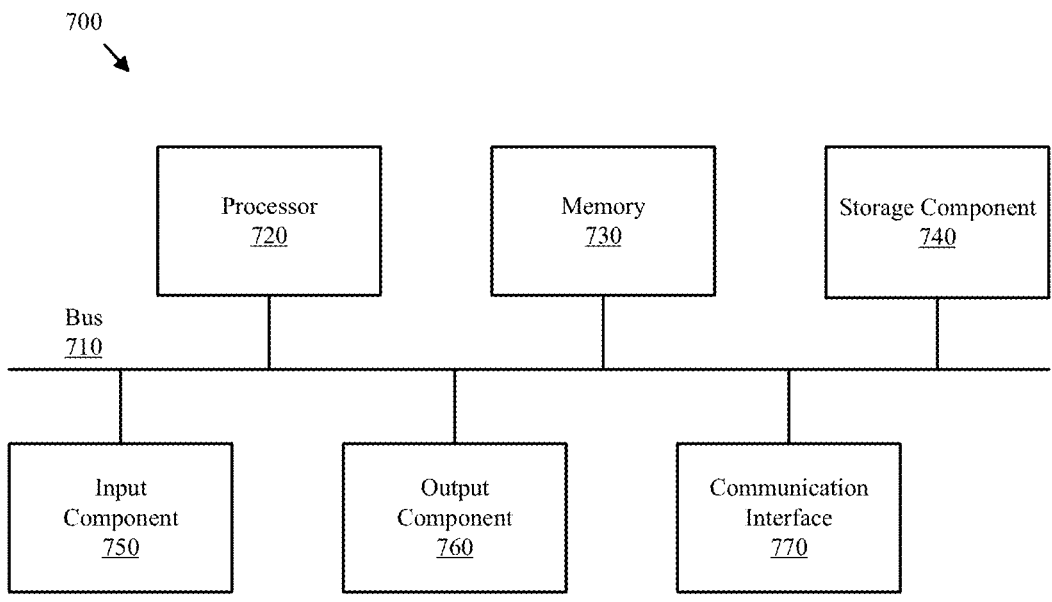
FIG. 7 is a diagram of example components of one or more devices of FIG. 1, according to embodiments of the present disclosure.

FIG. 7 is a diagram of example components of one or more devices of FIG. 1, according to embodiments of the present disclosure.

FIG. 7 is a diagram of example components of a remote electronic device 101-1. The remote electronic device 101-1 may correspond to a device associated with an authorized user, an operator of a cell, a RF engineer, components of the telecommunication network, or RF geographic location. The remote electronic device 101-1 may be used to communicate with cloud platform 620 or the test controller 125. As shown in FIG. 7, the remote electronic device 101-1 may include a bus 710, a processor 720, a memory 730, a storage component 740, an input component 750, an output component 760, and a communication interface 770.

Bus 710 includes a component that permits communication among the components of the remote electronic device 101-1. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of the remote electronic device 101-1. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits the remote electronic device 101-1 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from the remote electronic device 101-1 (e.g., a display, a speaker, and/or one or more light-emitting diodes (LEDs)).

Communication interface 770 includes a transceiver-like component (e.g., a transceiver and/or a separate receiver and transmitter) that enables the remote electronic device 101-1 to communicate with other devices, such as via a wired connection, a wireless connection, or a combination of wired and wireless connections. Communication interface 770 may permit the remote electronic device 101-1 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

The remote electronic device 101-1 may perform one or more processes described herein. The remote electronic device 101-1 may perform these processes in response to processor 720 executing software instructions stored by a non-transitory computer-readable medium, such as memory 730 and/or storage component 740. A computer-readable medium may be defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

What is claimed is:

1. A method of remote testing a telecommunication network, the method comprising:
   transmitting, by a test controller to an electronic device, a testing command, wherein the testing command comprises information associated with one or more tests to be performed by the electronic device for testing network performance;
   based on a test of the one or more tests being unsuccessful, receiving, by the test controller from the electronic device, a test result corresponding to the unsuccessful test;

based on the test result received from the electronic device, obtaining, by the test controller, log data for the test from one or more network elements in the telecommunication network; and analyzing, by the test controller, the obtained log data to determine a network element among the one or more network elements that causes the test to be unsuccessful.

2. The method of claim 1, further comprising:

synthesizing, by the electronic device, log data for the one or more tests;

validating, by the electronic device, a test from the one or more tests based on at least one of a comparison between log data for the test and a reference log or an analysis of the log data for the test using a machine-learned model; and based on the test of the performed one or more tests being unsuccessful, transmitting, from the electronic device to the test controller, information indicating the test as unsuccessful.

3. The method of claim 1, wherein the analyzing comprises determining, by the test controller, an error associated with the network element that causes the test to be unsuccessful based on the obtained log data and a reference file.

4. The method of claim 3, wherein the determining the error comprises using a machine-learned model, wherein the machine-learned model is trained using previously collected log data from the one or more network elements.

5. The method of claim 1, further comprising, transmitting, by the test controller based on determining the network element that cause the test to be unsuccessful, a command comprising instructions to modify characteristics of the network element that causes the test to be unsuccessful.

6. The method of claim 1, wherein the one or more tests are designed to test radio network parameters.

7. The method of claim 1, wherein the one or more tests comprises one of a verification VoLTE call, testing a MIMO update, or testing beamforming characteristics.

8. The method of claim 1, wherein the testing command is received by the electronic device automatically.

9. An apparatus for remote testing a telecommunication network, the apparatus comprising:

at least one memory configured to store computer program code; and at least one processor configured to access the computer program code and operate as instructed by the computer program code, the computer program code including:

first transmitting code configured to cause the at least one processor to transmit, to an electronic device, a testing command, wherein the testing command comprises information associated with one or more tests to be performed by the electronic device for testing network performance;

first receiving code configured to cause the at least one processor to receive, from the electronic device, a test result corresponding to an unsuccessful test from among the one or more tests performed by the electronic device;

first obtaining code configured to cause the at least one processor to, based on the test result received from the electronic device, obtain log data for the test from one or more network elements in the telecommunication network; and first analyzing code configured to cause the at least one processor to analyze the obtained log data to determine a network element, from among the one or more network elements, that causes the test to be unsuccessful.

10. The apparatus of claim 9, wherein the test result is received from the electronic device based on the electronic device:

synthesizing log data for the one or more tests; and validating a test from the one or more tests based on at least one of a comparison between log data for the test and a reference log or an analysis of the log data for the test using a machine-learned model.

11. The apparatus of claim 10, wherein the first analyzing code comprises first determining code configured to cause the at least one processor to determine an error associated with the network element that causes the test to be unsuccessful based on the obtained log data and a reference file.

12. The apparatus of claim 11, wherein the first determining code comprises using a machine-learned model, wherein the machine-learned model is trained using previously collected log data from the one or more network elements.

13. The apparatus of claim 9, wherein the program code further comprises, second transmitting code configured to cause the at least one processor to transmit, based on determining the network element that cause the test to be unsuccessful, a command comprising instructions to modify characteristics of the network element that causes the test to be unsuccessful.

14. The apparatus of claim 9, wherein the one or more tests are designed to test radio network parameters.

15. The apparatus of claim 9, wherein the one or more tests comprises one of a verification VoLTE call, testing a MIMO update, or testing beamforming characteristics.

16. The apparatus of claim 9, wherein the testing command is received by the electronic device automatically.

17. A non-transitory computer readable medium storing a program causing a computer to execute a process, the process comprising:

transmitting, by a test controller to an electronic device, a testing command, wherein the testing command comprises information associated with one or more tests to be performed by the electronic device for testing network performance;

based on a test of the one or more tests being unsuccessful, receiving, by the test controller from the electronic device, a test result corresponding to the unsuccessful test;

based on the test result received from the electronic device, obtaining, by the test controller, log data for the test from one or more network elements in the telecommunication network; and analyzing, by the test controller, the obtained log data to determine a network element among the one or more network elements that causes the test to be unsuccessful.

18. The non-transitory computer readable medium of claim 17, wherein the process further comprises:

synthesizing, by the electronic device, log data for the one or more tests;

validating, by the electronic device, a test from the one or more tests based on at least one of a comparison between log data for the test and a reference log or an analysis of the log data for the test using a machine-learned model; and based on the test of the performed one or more tests being unsuccessful, transmitting, from the electronic device to the test controller, information indicating the test as unsuccessful.

19. The non-transitory computer readable medium of claim 17, wherein the analyzing comprises determining, by the test controller, an error associated with the network element that causes the test to be unsuccessful based on the obtained log data and a reference file.

20. The non-transitory computer readable medium of claim 19, wherein the determining the error comprises using a machine-learned model, wherein the machine-learned model is trained using previously collected log data from the one or more network elements.

\* \* \* \* \*